(12) United States Patent
Stupar et al.

(10) Patent No.: US 6,613,176 B2
(45) Date of Patent: Sep. 2, 2003

(54) METHOD OF ARRANGING MULTILAYER PASSIVE ELECTRONIC COMPONENTS

(75) Inventors: Joze Stupar, Dvor pri Zuzemberku (SI); Anton Konda, Zuzemberk (SI)

(73) Assignee: Keko Oprema, d.o.o., Zuzemberg (SI)

( * ) Notice: Subject to any disclaimer, the term of this patent is extended or adjusted under 35 U.S.C. 154(b) by 0 days.

(21) Appl. No.: 10/172,409

(22) Filed: Jun. 14, 2002

(65) Prior Publication Data

US 2002/0162625 A1 Nov. 7, 2002

Related U.S. Application Data

(63) Continuation of application No. 09/485,078, filed as application No. PCT/SI99/00016 on Jun. 4, 1999, now Pat. No. 6,432,250.

(30) Foreign Application Priority Data

Jun. 5, 1998 (JP) ............................................. P-9800165

(51) Int. Cl.$^7$ ................................................. B32B 31/00
(52) U.S. Cl. ........................ 156/259; 156/267; 156/269; 156/581
(58) Field of Search ................................. 156/250, 259, 156/267, 269, 285, 580, 581, 583.1

(56) References Cited

U.S. PATENT DOCUMENTS

| 4,255,077 A | 3/1981 | Smith |
| 4,995,933 A | 2/1991 | Brussel |
| 5,019,200 A | 5/1991 | Kawabata et al. |
| 5,470,193 A | 11/1995 | Miura et al. |
| 5,827,382 A | 10/1998 | Ogawa et al. |
| 5,879,500 A | 3/1999 | Herrin et al. |
| 6,432,250 B1 * | 8/2002 | Stupar et al. ................. 156/259 |

FOREIGN PATENT DOCUMENTS

| DE | 1173 784 | 7/1964 |
| DE | 3345 877 A1 | 6/1985 |
| DE | 3941 346 A1 | 6/1990 |
| EP | 0 530 052 A1 | 3/1993 |
| FR | 2 387 567 | 11/1978 |
| FR | 2 578 484 | 9/1986 |
| FR | 2 633 549 | 1/1990 |
| JP | 09129502 | 5/1997 |
| JP | 10284346 | 10/1998 |

* cited by examiner

Primary Examiner—James Sells
(74) Attorney, Agent, or Firm—Ziolkowski Patent Solutions Group, LLC

(57) ABSTRACT

Subject invention provides method of arranging multilayer passive electronic components, enabling simple arranging of rolled thin foil from a roll on a supporting block in order to form a stack, where supporting plastic foil with thin foil (63) in it is led from unrolling mechanism (67) for unrolling the foil, over the cross knife (66) and over two rotating side knives (68), through the pressing tool (65) over the separating crossbar (610) and pulling mechanism (612) to the rolling mechanism (611) for rolling the supporting foil, from which the thin foil is already separated, where the supporting block (57) is put under the pressing tool (65). The invention also provided the supporting block.

20 Claims, 6 Drawing Sheets

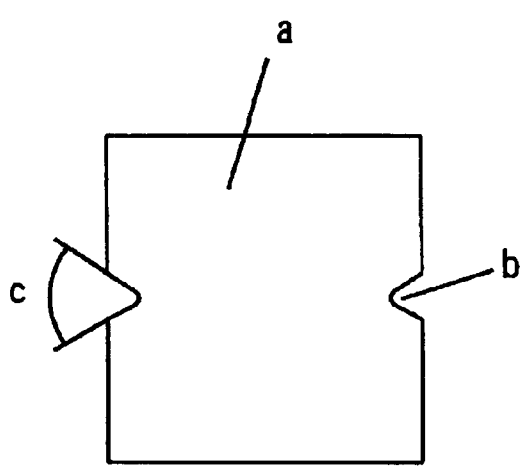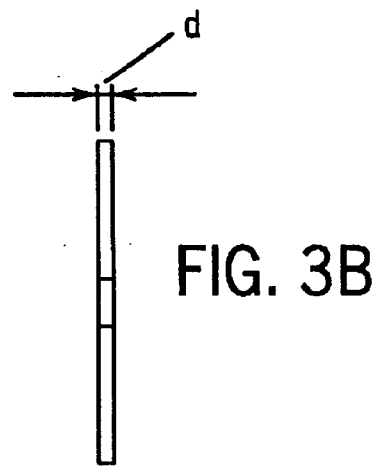
FIG. 3A  FIG. 3B
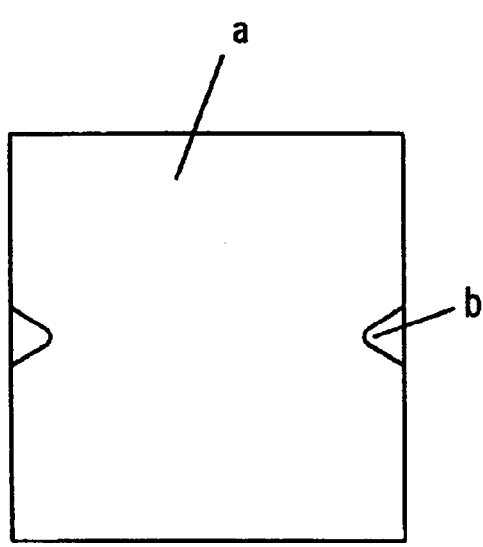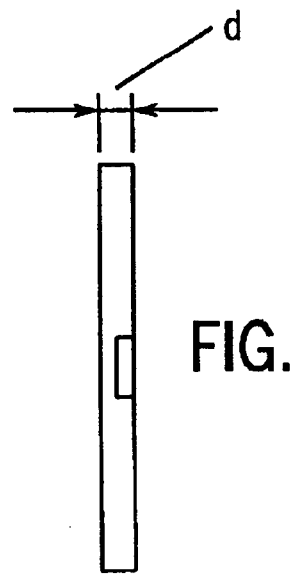
FIG. 4A  FIG. 4B

METHOD OF ARRANGING MULTILAYER PASSIVE ELECTRONIC COMPONENTS

CROSS-REFERENCE TO RELATED APPLICATION

The present application claims is a continuation of allowed U.S. patent application Ser. No. 09/485,078 filed Feb. 2, 2000 U.S. Pat. No. 6,432,250, which is a 371 of PCT/SI99/00016, filed Jun. 4, 1999, entitled "Method of Arranging Multilayer Passive Electronic Components".

FIELD OF INVENTION

This invention belongs to the field of manufacturing electronic components. More specifically it belongs to the field of arranging multilayer passive electronic components e.g. ceramic condensers, varistors, inductors, etc., composed or arranged from relatively thin layers.

TECHNICAL PROBLEM AND STATE OF THE ART

Improvement of multilayer electronic component characteristics normally requires decreasing of layer thickness and increasing of number of layers. Usually thin layer of ceramic or other material is brought onto supporting substrate, normally a plastic foil. Separation of such thin layer from the supporting foil and arranging into a stack is practical problem, becoming even greater when thinner layers are applied. Another problem is precise placement of each of electrode layers against other electrode layers, especially when the number of layers is large.

SHORT DESCRIPTION OF DRAWINGS

Figure 1:
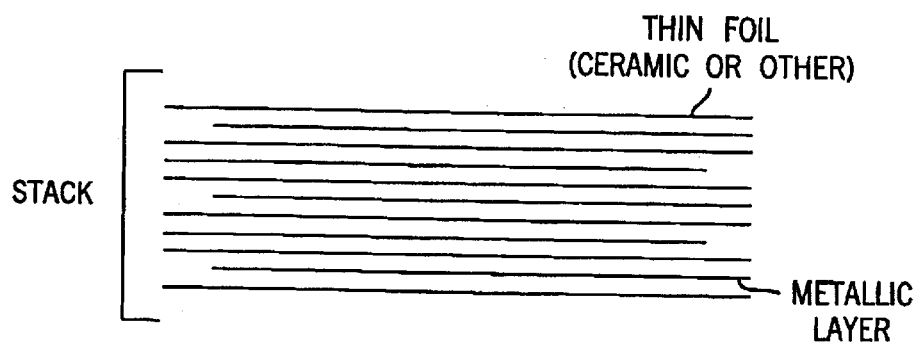

Subject invention is further described, with reference to the following drawings, which show:

FIG. 1: an example of composing multilayer ceramic condenser

Figure 2:
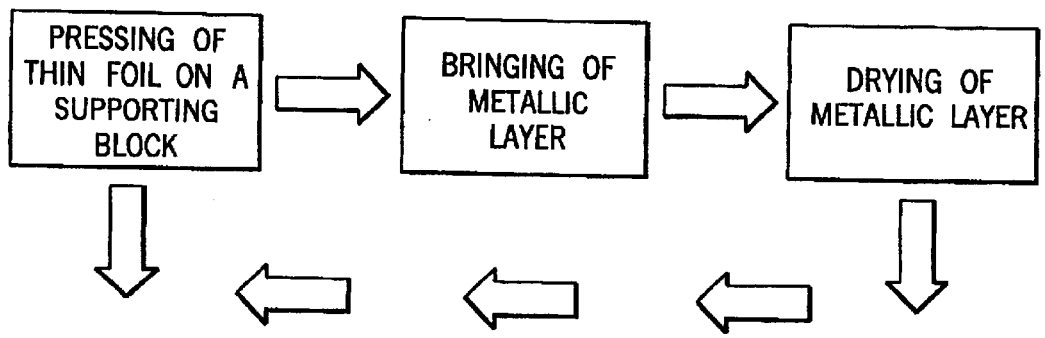

FIG. 2: procedure of arranging a stack

FIG. 3A: shape of centering grooves of thinner supporting block

FIG. 3B: side elevational view of that shown in FIG. 3A

FIG. 4A: shape of centering grooves of thicker supporting block

FIG. 4B: side elevational view of that shown in FIG. 4A

Figure 5A:
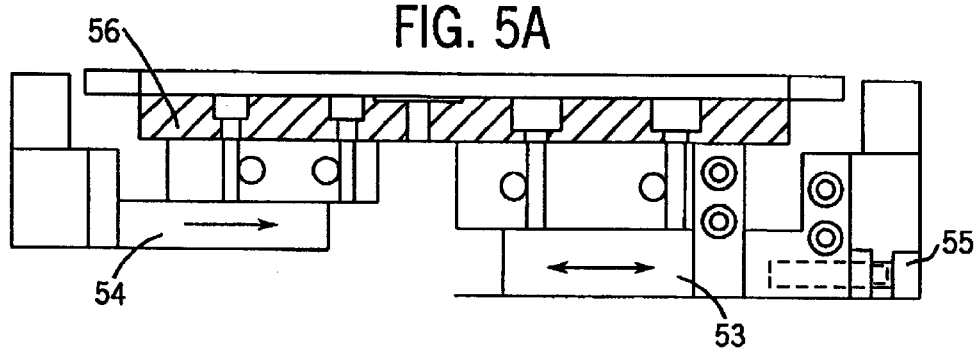
Figure 5B:
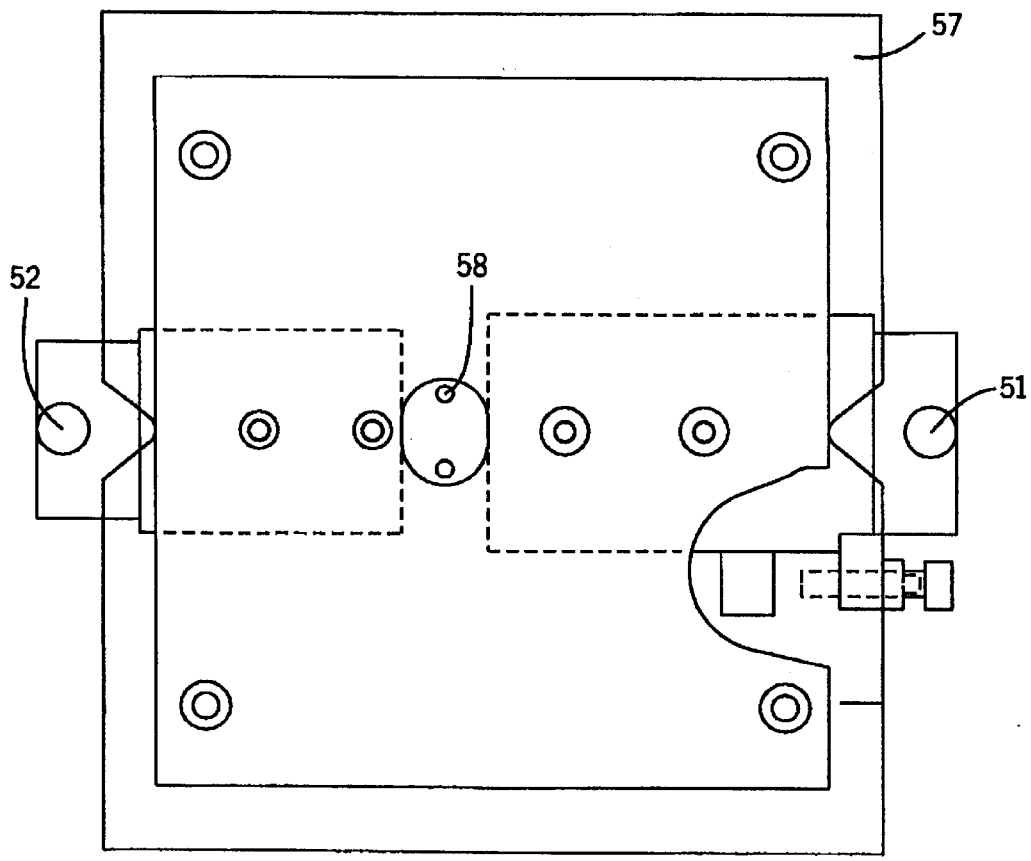

FIGS. 5A–5B: method of centering of supporting block

Figure 6:
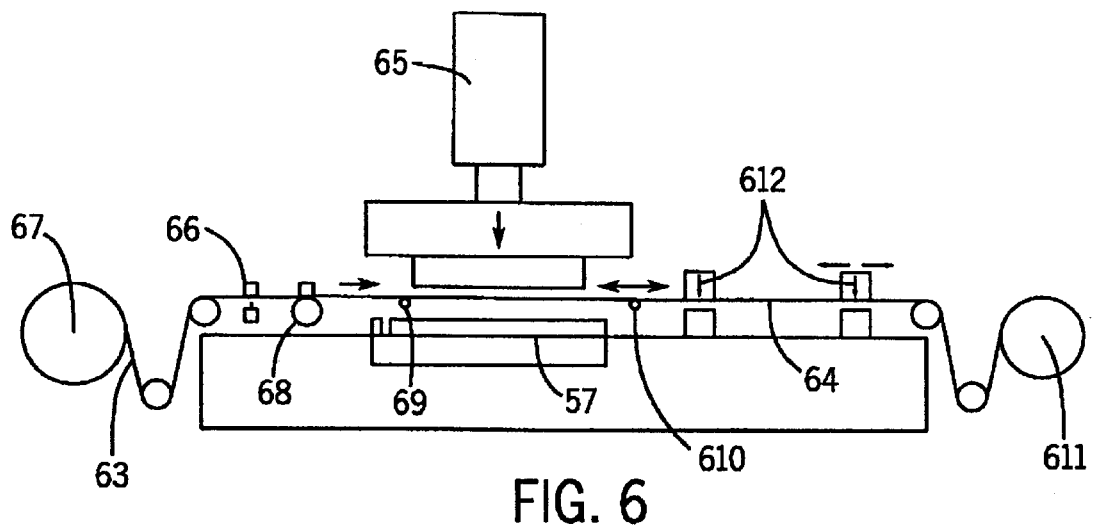

FIG. 6: composing of rolled thin foil onto a supporting block in a stack

Figure 7:
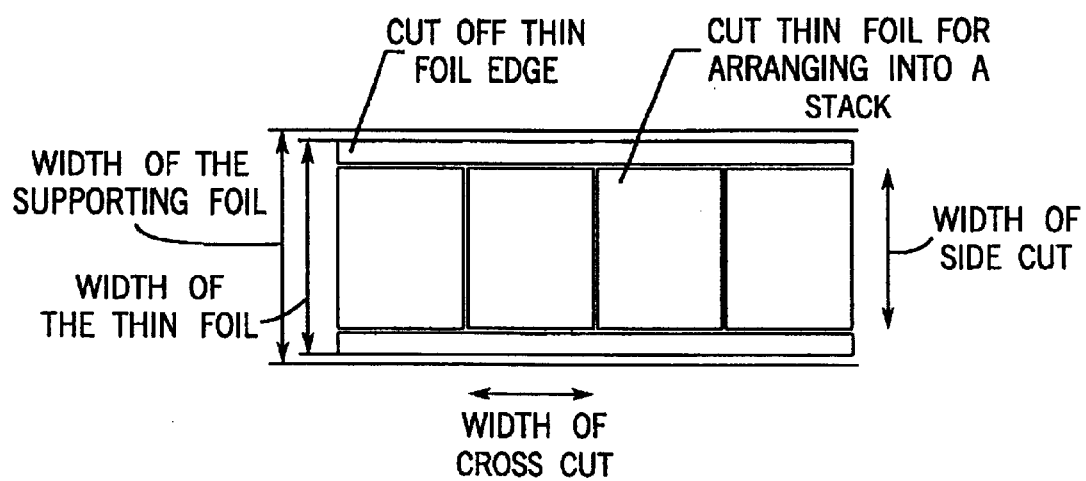
Figure 8A:
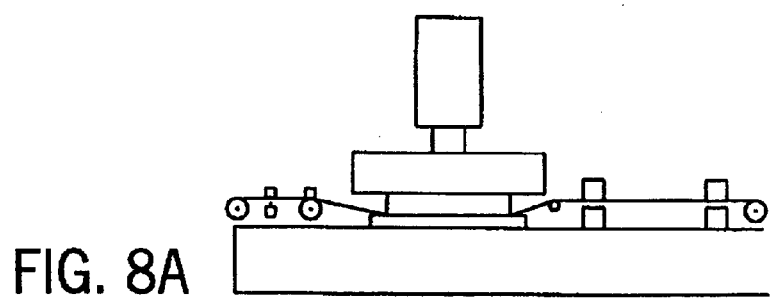
Figure 8B:
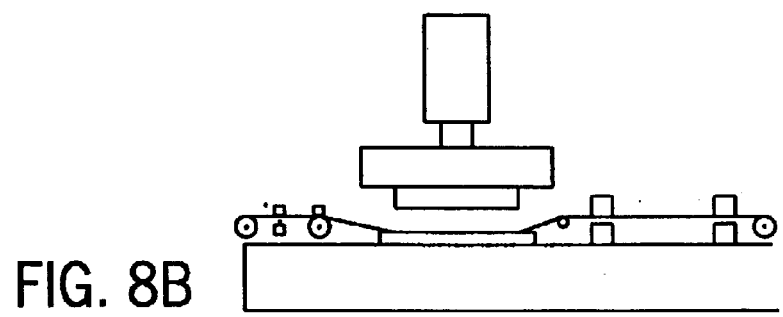
Figure 8C:
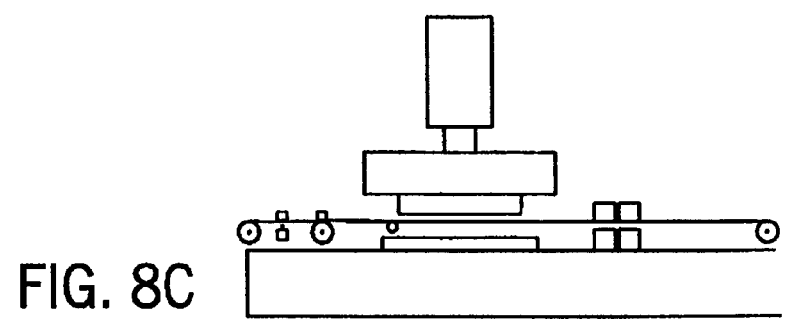
Figure 8D:
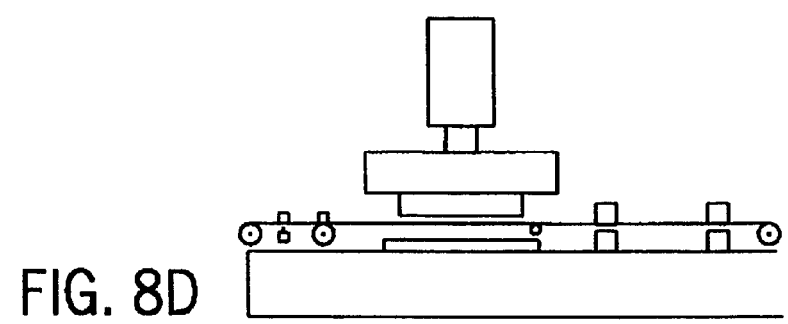

FIG. 7: cutting edges of foil on supporting foil for composing into a stack

FIGS. 8A–8D: perspective view of stack during steps of composition

Figure 9:
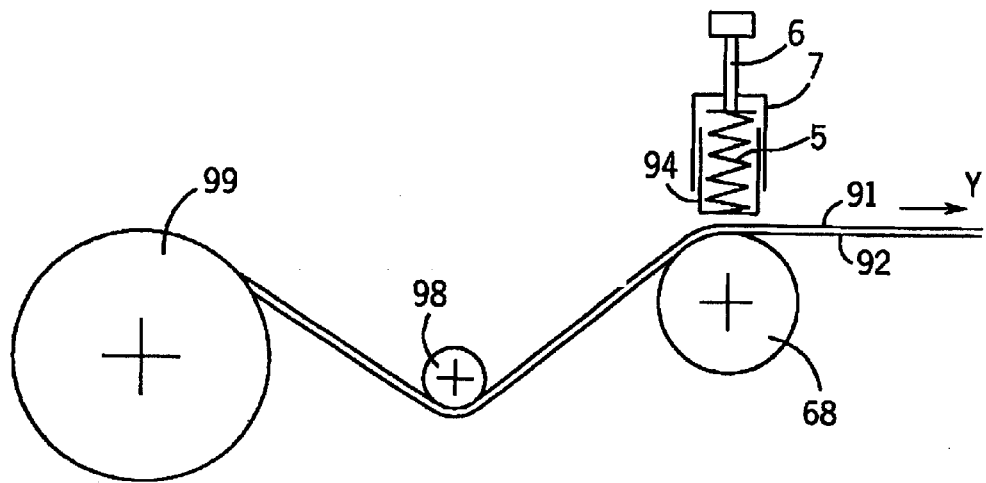

FIG. 9: thin foil longitudinal cutting

Figure 10:
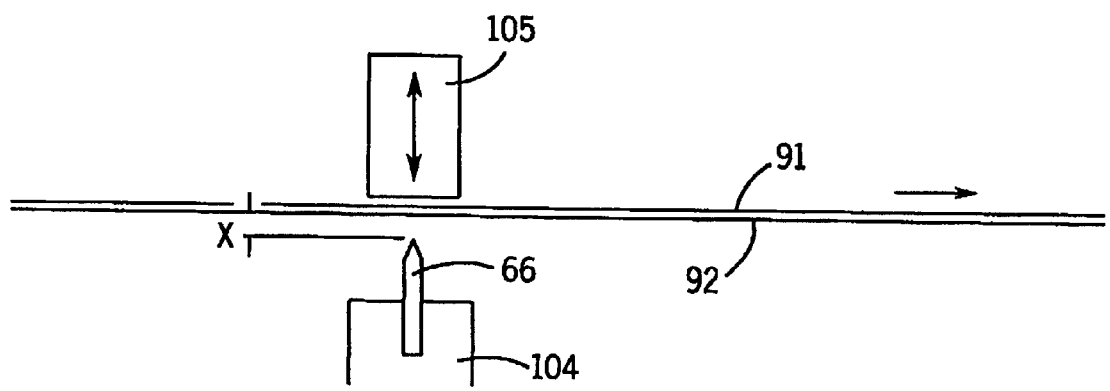

FIG. 10: thin foil cross cutting

DESCRIPTION OF THE INVENTION

Subject invention provides solution to the problem of arranging or composing of thin layers of multilayer electronic components and furthermore it provides precise placement of each of electrode layers against other electrode layers, also when the number of electrode layers is large.

FIG. 2 shows typical course of composing a stack according to the present invention. Each foil is pressed on a supporting block, after which a metallic layer is brought onto it, and the metallic layer is dried. These steps are then repeated, until the desired number of layers is reached.

FIGS. 3A and 3B schematically show a supporting block (a), which is a metallic plate of perpendicular shape. Dimensions of the supporting block are equal to or larger from dimensions of the stack. The supporting block has two symmetrical wedge-shaped centering grooves (b), one on each of two opposite sides, where the top of each wedge-shaped groove may be rounded up.

Said centering grooves (b) render possible positioning of the supporting block with positioning or also called centering bolts, during various operations are being carried out, like printing, foil arranging, product pressing, etc. The angle (c) of said centering wedge-shaped grooves (b) is between 15° and 120°, which provides reliable adjustment of centering bolts to a centering grooves (b). When the thickness (d) of supporting block (a) is smaller, centering grooves pass through the whole thickness (d) of the supporting block (a), as best shown in FIG. 3B. In case of larger thickness (d) of supporting block (a), the centering grooves (b) are formed only on the bottom side of the supporting block (a), as shown in FIGS. 4A and 4B.

FIGS. 5A and 5B show method for centering of supporting blocks, which are being deposited on a fastening plate (56), on each manufacturing station, where positioning and fastening of supporting block is being carried out in a manner as described below.

Two positioning bolts (51, 52) are precisely guided in two guiding elements (53, 54). The centering bolt (51) travels towards the supporting block (57) until it sits into a corresponding centering groove. A limitation element (55), which is in this example a screw, limits traveling distance of the centering bolt (51). When movement of the positioning bolt (51) is concluded the positioning bolt (52) begins to move towards the supporting block (57). When both positioning bolts (51, 52) sit in corresponding centering grooves the supporting block (51) is centered.

Supporting block (57) may be fastened onto a fastening plate (56) by means of suction, in which case at least one suction outlet (58) is provided perpendicularly through the supporting plate (56), which enables fastening of the supporting block (56) onto a fastening plate (57), by the means of vacuum. For fastening of larger supporting blocks onto a fastening plate (57), number of said outlets (58) is greater.

FIG. 6 shows method for simple arrangement of thin rolled foil in a stack on a supporting block. Supporting foil with thin foil (63) on it, is led from unrolling mechanism (67) for unrolling of supporting foil, over the cross knife (66) and over two side knives (68), through a pressing tool (65), over the separating crossbar (610) and pulling mechanism (612) to the rolling mechanism (611) for rolling of the supporting foil. Supporting block (57) is put under the pressing tool (65) in such manner, that a notch (69) on a thin foil (63) is positioned as shown in FIG. 6.

As shown in FIG. 7, thin foil is cut with cross knife (66) and longitudinally edged with rotating side knives (68).

According to above explanation of FIGS. 5A, 5B, and 6, arrangement of thin foil into a stack includes following steps, which are shown in FIGS. 8A–8D:

Step 1: Pressing of Thin Foil on a Supporting Block

Pressing toll presses thin foil, together with a supporting foil on a supporting block. Since the thin foil is relatively plastic and therefore slightly adhesive, it will stick onto the supporting block. If the foil lacks adhesiveness, thin layer of adhesive or wax will be put on the supporting block prior to the said pressing operation. Proper pressing force is achieved with pneumatic, hydraulic or mechanical power. Pressing force and pressing time are adjustable, so for example foils with different mechanical and/or other properties may be used.

Step 2: Opening of the Pressing Tool

After prearranged pressing time, the pressing tool opens, with the thin foil remaining stuck on a supporting block Step 3: Separation of Thin Foil from the Supporting Foil Crossbar (610), shown in FIG. 6, for separation of thin foil from supporting foil moves to the left side, thus separating supporting foil from the thin foil, which remains stuck on the supporting block.

Step 4: Pulling of the Supporting Foil for One Division

After the thin foil has been separated from the supporting foil, pulling mechanism (612) pulls the supporting foil for one division towards the rolling mechanism. During the pulling operation rotating side knives (68) longitudinally edge the thin foil. When the pulling operation is completed, the cross knife (66) cuts the thin foil in cross direction.

Implementation of side edging and cross cutting is further described and shown below. The step of pressing (Step 1) may be repeated a number of times, while the thin foil is arranged one onto another, or on supporting blocks, which are after every new layer of thin foil transported to a workstation, where a metallic layer is put on, dried and transported back in the pressing tool, as shown in FIG. 2.

Surface of a pressing tool is shaped in such a manner to provide equal pressure over the whole surface, and may be plane or on the other hand it may follow irregular shape of the stack.

FIG. 9 schematically shows side edging of the thin foil. Purpose of this operation is:

side edging of the thin foil, to provide desired width
cutting off the edge of the thin foil, due to uneven thickness of the foil edge, as shown in FIG. 7.

FIG. 9 shows supporting plastic foil (91), carrying thin foil (92), which is rolled on a roller (99) and under a straining weight (98) and over rotating side knives (68) led to a pulling mechanism (112) shown in FIG. 6. Pulling mechanism (112) pulls both foils in direction of arrow (Y) shown in the FIG. 9. The edge of cutting rotating knife (68) with it's sharp edge touches the thin foil, and due to a force provided by a push bar (94), which is placed in a housing (97), sharp edge of the knife (68) cuts the thin foil (92).

FIG. 10 shows cross cutting of thin foil, which may also be carried out in a combination with longitudinal cutting (i.e. edging) if so desired.

Cross cutting of the thin foil is implemented while between two movements of the foil, thus when the foil is in a stand still position, and provides perpendicularity of the parts cut out from the thin foil, and furthermore perpendicular shape of the stack.

Supporting plastic foil (91) with thin foil (92) on the lower side is stretched over the cross knife (66), which is with a knife handle (104) fastened on the machine housing. Distance (x) between the thin foil (92) and the cross knife (66), enables undisturbed movement of the foil. When the foil is not moving, a cross-push bar (105) moves downward, bends the foil and presses it against the cutting edge of a cross knife (66). The cross knife (66) cuts into and through the thin foil (92), while the supporting foil (91) remains uncut.

As shown in FIG. 7, the length of the cross cut between longitudinal cuts equals width of the cross cuts.

Purpose of above description of the subject invention is to illustrate the invention in the best way, and does not anyhow limit the scope of the invention. Skilled in the art will find different variations of the present invention. All such variations are within the scope and spirit of this invention. Scope of this invention is defined by the enclosed claims.

What is claimed is:

1. A method of fabricating a multilayer passive component comprising the steps of:

(A) securing a layer of foil onto a supporting block;
   (B) cutting the layer of foil along at least one axis such that the layer has dimensions similar to the supporting block;
   (C) depositing a metallic layer onto the cut layer; and
   (D) repeating steps (B)–(C) for each additional layer of foil of the multilayer passive component.

2. The method of claim 1 wherein the step of depositing further includes the step of drying the metallic layer after the metallic layer is placed onto the cut layer.

3. The method of claim 1 wherein the step of securing further comprises the step of placing adhesive on the supporting block such that the layer of thin foil will adhere to the supporting block.

4. The method of claim 1 wherein the step of securing further comprises the step of pressing the layer of thin foil onto the supporting block.

5. The method of claim 4 wherein the step of pressing further includes the step of applying at least one of a pneumatic, a hydraulic, and a mechanical force to the layer of foil and supporting block to secure the layer of foil to the supporting block.

6. The method of claim 1 wherein the layer of thin foil is formed of a plastic material.

7. The method of claim 1 further comprising the step of centering the supporting block on a fastening plate prior to the securing of the layer of foil.

8. A method of aligning layers of a multilayer component comprising the step of:

positioning a supporting block onto a fastening plate, the supporting block having a pair of grooves and the fastening plate having a pair of centering bolts;
   removably fastening the supporting block to the fastening plate; and
   applying at least one layer of foil to the supporting block.

9. The method of claim 8 wherein the step of removably fastening further includes the step of temporarily sealing the supporting block to the fastening plate.

10. The method of claim 9 wherein the step of temporarily sealing includes the step of creating a vacuum between the supporting block and the fastening plate.

11. The method of claim 10 wherein the fastening plate includes a vertical hole passing therethrough to effectuate a suctioning effect to thereby create the vacuum between the supporting block and the fastening plate.

12. The method of claim 10 wherein the step of applying further comprises the step of adhesively securing the at least one layer of foil to the supporting block under a pressing action.

13. The method of claim 12 further comprising the step of applying one of a hydraulic, a pneumatic, and a mechanical force to the at least one layer of foil and the supporting block.

14. The method of claim 8 further comprising the step of cutting the at least one layer of foil in at least one direction such that the at least one layer of foil has dimensions similar to dimensions of the supporting block.

15. An apparatus for aligning layers of a multilayer electronic component device, the apparatus comprising:
   a fastening plate having at least one centering bolt;
   a supporting block having at least one centering groove configured to receive the at least one centering bolt; and
   a limitation element configured to limit traveling distance of the at least one centering bolt.

16. The apparatus of claim 15 wherein the at least one centering bolt includes a pair of centering bolts and the at least one centering groove includes a pair of centering grooves.

17. The apparatus of claim 16 wherein the pair of centering grooves is disposed on opposite sides of the supporting block.

18. The apparatus of claim 17 wherein each centering groove is centrally disposed along a respective side of the supporting block.

19. The apparatus of claim 15 wherein the supporting block includes at least one suction port.

20. The apparatus of claim 15 wherein the supporting plate is configured to support at least one layer of foil under pressing.

* * * * *